(12) United States Patent
McKee et al.

(10) Patent No.: US 8,150,905 B2
(45) Date of Patent: Apr. 3, 2012

(54) PROCESS CONFIGURATION IN A NETWORK

(75) Inventors: Paul F McKee, Colchester (GB);
Michael A Fisher, Ipswich (GB)

(73) Assignee: British Telecommunications PLC,
London (GB)

( * ) Notice: Subject to any disclaimer, the term of this patent is extended or adjusted under 35 U.S.C. 154(b) by 740 days.

(21) Appl. No.: 11/883,538

(22) PCT Filed: Feb. 6, 2006

(86) PCT No.: PCT/GB2006/000407
§ 371 (c)(1),
(2), (4) Date: Aug. 2, 2007

(87) PCT Pub. No.: WO2006/087518
PCT Pub. Date: Aug. 24, 2006

(65) Prior Publication Data
US 2008/0144529 A1    Jun. 19, 2008

(30) Foreign Application Priority Data
Feb. 15, 2005  (GB) .................. 0503141.4

(51) Int. Cl.
*G06F 15/16* (2006.01)
*G06F 15/173* (2006.01)
*H04L 12/28* (2006.01)
(52) U.S. Cl. ............... 709/201; 709/223; 370/254
(58) Field of Classification Search .......... 709/220–223, 709/238; 370/254, 351
See application file for complete search history.

(56) References Cited

U.S. PATENT DOCUMENTS

| 6,286,047 | B1 | 9/2001 | Ramanathan et al. | |
|---|---|---|---|---|
| 7,280,975 | B1* | 10/2007 | Donner | 705/10 |
| 2003/0036917 | A1 | 2/2003 | Hite et al. | |
| 2003/0055817 | A1 | 3/2003 | Yoshimura et al. | |
| 2004/0122926 | A1 | 6/2004 | Moore et al. | |
| 2004/0220910 | A1 | 11/2004 | Zang et al. | |
| 2004/0260761 | A1* | 12/2004 | Leaute et al. | 709/201 |
| 2005/0021663 | A1 | 1/2005 | Knauerhase | |
| 2005/0021758 | A1* | 1/2005 | White | 709/226 |
| 2006/0020657 | A1* | 1/2006 | Liu et al. | 709/201 |

FOREIGN PATENT DOCUMENTS

| JP | 2004-235894 | 8/2004 |
|---|---|---|
| JP | 2004-246784 | 9/2004 |
| JP | 2004-287803 | 10/2004 |
| JP | 2004-361993 | 12/2004 |
| JP | 2005-010880 | 1/2005 |

OTHER PUBLICATIONS

International Search Report mailed Apr. 4, 2006 in PCT/GB2006/000407.
UK Search Report dated Apr. 29, 2005 in Application No. GB0503141.4.

(Continued)

*Primary Examiner* — Brian J Gillis
*Assistant Examiner* — David X Yi
(74) *Attorney, Agent, or Firm* — Nixon & Vanderhye PC

(57) ABSTRACT

A network is configured or made configurable to provide a process exploiting services distributed among nodes of the network by means of a step-by-step search, the search for one service starting at a node providing a previous service.

37 Claims, 6 Drawing Sheets

OTHER PUBLICATIONS

"Domain Name System," archived Nov. 6, 2004 from Wikepedia, 5 pages.
Narten, "Internet Routing," ACM, 1989, pp. 271-282.
Clip2 Distributed Search Solutions, "The Gnutella Protocol Specification v0.4," archived Apr. 9, 2003, 8 pages.
Clarke et al., "Freenet: A Distributed Anonymous Information Storage and Retrieval System," Jun. 25, 2003, pp. 1-21.
Andrews et al., "Business Process Execution Language for Web Services," Version 1.1, May 5, 2003, pp. 1-136.
Christensen et al., "Web Services Description Language (WSDL) 1.1," Mar. 15, 2001, 51 pages.
Mitra, "SOAP Version 1.2 Part 0: Primer," W3C Recommendation, Jun. 24, 2003, 53 pages.
Bellwood et al., UDDI Spect TC, UDDI Version 3.0.2, Oct. 19, 2004, 422 pages.
Office Action issued in corresponding Japanese Application No. 2007-554629 on May 31, 2011 (with translation).

* cited by examiner

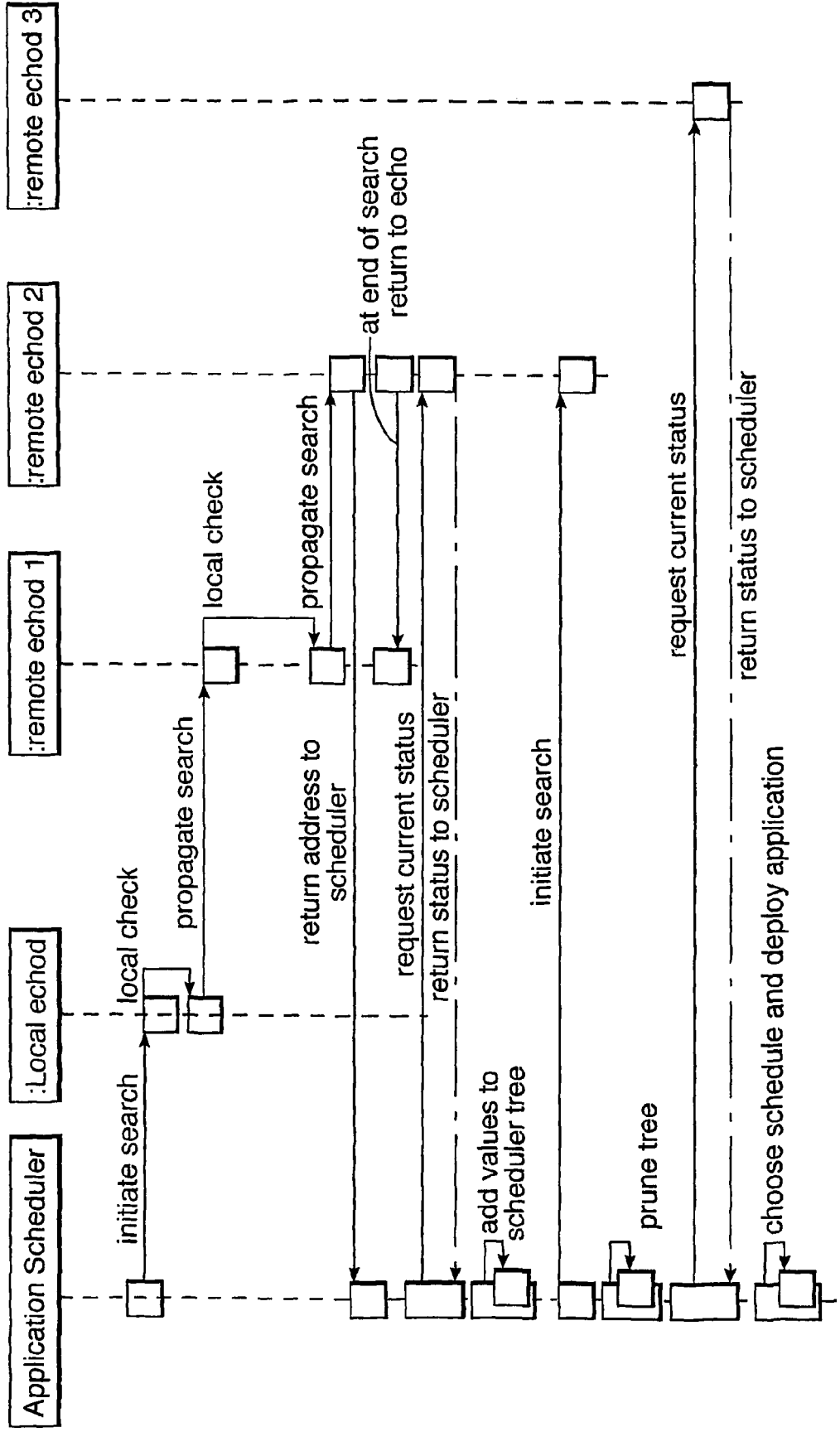

PROCESS CONFIGURATION IN A NETWORK

This application is the US national phase of international application PCT/GB2006/000407 filed 6 Feb. 2006 which designated the U.S. and claims benefit of GB 0503141.4, dated 15 Feb. 2005, the entire content of which is hereby incorporated by reference.

BACKGROUND

1. Technical Field

The present invention relates to a method for setting up a process in a computer network and in particular for the location and selection of services to provide the process. The invention also extends to a suitable network.

2. Related Art

Web Services is a phrase used to describe the way in which services can be exposed and used on a network. Web Services concern the way in which software communicates. Software can come in many forms from a simple script on a personal computer, to an application on a networked server, through to a large operational support system running on a mainframe computer. These scripts, applications and software systems are examples of software components. Web services is based on software components that allow themselves to be used by other software components A number of technologies have matured and become standardised to allow software components to be deployed to provide a Web Service and these include: simple object access protocol (SOAP); web services description language (WSDL); Universal Description, Discovery, and Integration (UDDI).

A Web Service can be described using WSDL, it can be located using UDDI and its functionality invoked using SOAP. These three technologies are built upon the common data description standard Extensible Mark-up Language (XML). XML is a standard specification for defining the content of a computer message and provides a common way to represent the content of a message sent between one software component and another. If a software application writes its output in XML any another application capable of interpreting XML can read the output and act on it.

SOAP provides the means by which one software component can invoke the functionality of another, using message-passing between the two as the means of invocation. The specification for SOAP is a world-wide standard, administered by the W3C, currently at version 1.2 issued by the W3C in June 2004: available at http://www.w3.org/TR/SOAP or as an archive at http://www.w3.org/TR/2003/REC-soap12-part0-20030624. SOAP uses a request-response mechanism in which one software component makes a request to another software component which then provides a response. Both request aid response are transported in the form of XML documents.

XML and SOAP provide, along with HTTP, the means for one software component to invoke the functionality of another over the Internet. These technologies can be used to integrate software components over any network that supports HTTP. In order to undertake this integration, the following information is also needed:
information on all available functions, including their calling parameters,
data type information for all XML messages, including the value specifications,
binding information about the specific transport protocol to be used,
address information for locating the specified service.

A WSDL file is an XML document that provides the information listed above about a software component. Using WSDL, a software component can integrate with any of the available functions of a Web Service. With WSDL-aware tools, this process can be entirely automated, enabling applications to easily integrate new services with little or no manual code. WSDL is defined at http:1/www.w3.org/TR/wsdl or as an archive at http://www.w3.org/TR/2001/NOTE-wsdl-20010315.

Web services have a wide range of applications including the provision of communications capability and services and business applications. When developing an application, it may be desirable to assess the merits of a number of software components from different sources, e.g. supplied by different companies. UDDI provides this extension to the basic Web Services technologies by allowing the means to create a registry of Web Services. This takes Web Services into the realm of companies doing business with each other over the Internet. The UDDI specification enables companies to quickly, easily, and dynamically find and transact with one another. UDDI enables a company to:
describe its services,
discover other companies that offer services,
integrate with these other services.

UDDI registry can be used to find a desired function. A request to the registry would be for a specific function and may include other requirements such as cost limits, security needs, performance criteria, etc. The registry would then propose one or more companies that provide such a function, allowing a choice of supplier. The specifications for UDDI allow, for example, the creation and use of a registry containing information about businesses and the services they offer. The specifications for UDDI are administered by the Organisation for the Advancement of Structured Information Standards (OASIS) and are available at http://uddi.org.

In addition to UDDI registries, there are listings of publicly available Web Services Web Services also have applications in communications networks, i.e. exposing network functionality as software services. Communications service providers can use Web Services to take advantage of the convergence of software and network technologies. For example, a video-on-demand Web Service may make use of a communication service that delivers the video stream (which may present itself as a Web Service).

Grid computing allows the pooling of resources across multiple systems and their allocation on demand to provide the quality of service typically associated with a single large mainframe or supercomputer but at a lower price/performance ratio. It works by creating a resource access framework which applications can call for allocation of resources. These resources are used by the requesting application and then subsequently released. The grid environment is inherently distributed, and may include the systems of outside organisations.

Grid implementations are typically constructed using a US-government sponsored, open source tool-kit known as Globus available at http://www.globus.org/. The relevance of this to Web Services is enhanced by a proposed standard known as the Open Grid Services Architecture (OGSA) available at http://www.globus.org/ogsa/ that defines a set of Web Services to create, terminate, manage and invoke services created from distributed resources.

The use of OGSA allows any Web Services based platform to create transient services to undertake particular functions that could range from the setting up of conference calls to the large-scale manipulation of data. These services themselves could be Web Services enabled for ease of access.

Here users access services through a service-oriented architecture (SOA.) These services are actually implemented by applications built on application server kernels that utilise grid protocols to share their resource usage. Any spare resources available can be brought together to create on-demand services though OGSA calls, again accessible through the SOA. Hence the actual customer experience will be created from an aggregation of permanent and transient services controlled through the SOA.

There is considerable interest in technical solutions that will allow the management of business processes by domain experts. An important goal is to eliminate the need for translation of business requirements into terms that can be used to specify supporting IT systems. Such translation is generally time consuming and unreliable. Relevant industry developments include service-oriented architectures (SOA) in which applications are assembled from service components in a graphical development environment and a functional specification of the business process is produced. This is exemplified by the recent release by Oracle Corporation of the Business Process Execution Language (BPEL) Designer application prototype which uses Business Process Execution Language for Web Services (BPEL4WS) to describe the structure of the application. This is an example of standardised syntax and semantics for describing and specifying business processes. Software tools are then be able to use the specification to support business process management.

The major technical problem given such an abstract process description is how to build a concrete realisation with the desired level of performance. Assuming that the process is to be composed from a set of web services, one approach could be to query a set of directories (e.g. using the UDDI—Universal Description, Discovery and Integration protocol) to find instances of the services required in the business process. The directories would be queried to find instances of all the services required by the process specification. If grid services are in use the directories could also be queried for suitable nodes to instantiate the required services on.

This approach is reasonable for business processes consisting of independent services. Each service instance can then be selected separately on the basis of its individual performance characteristics. In more complex situations the process may require the results of one or more services to be provided as input to another service which therefore cannot proceed until predecessor services have completed. Process provision may be rendered less efficient by the inclusion of slower "bottleneck" services. In addition, if a significant quantity of data must be transferred between services, the characteristics of the network connectivity between service instances can also adversely effect the performance of the desired process.

Unfortunately, the information available in web service directories typically does not include the relative locations or current performance of any of the services. For complex processes or where there is a wide choice of instances of a commonly available service, there is a large number of possible configurations. Deciding which of these are able to satisfy the desired quality of service will require the collection of much more information and complex optimisation, i.e. typically requiring a significant amount of effort.

BRIEF SUMMARY

The present exemplary embodiment avoids or reduces the above problems by providing a method as set out in claim 1 and/or a network as set out in claim 20.

BRIEF DESCRIPTION OF THE DRAWINGS

Embodiments of the invention will now be described by way of example with reference to the drawings in which

FIG. 6 shows the searches of FIGS. 3 and 4 as a UML diagram.

DETAILED DESCRIPTION OF EXEMPLARY EMBODIMENTS

A first embodiment of the invention will now be described by way of example with reference to a user with access to a network supporting web services. The user wishes to set up a process using the resources of the network.

Figure 1:
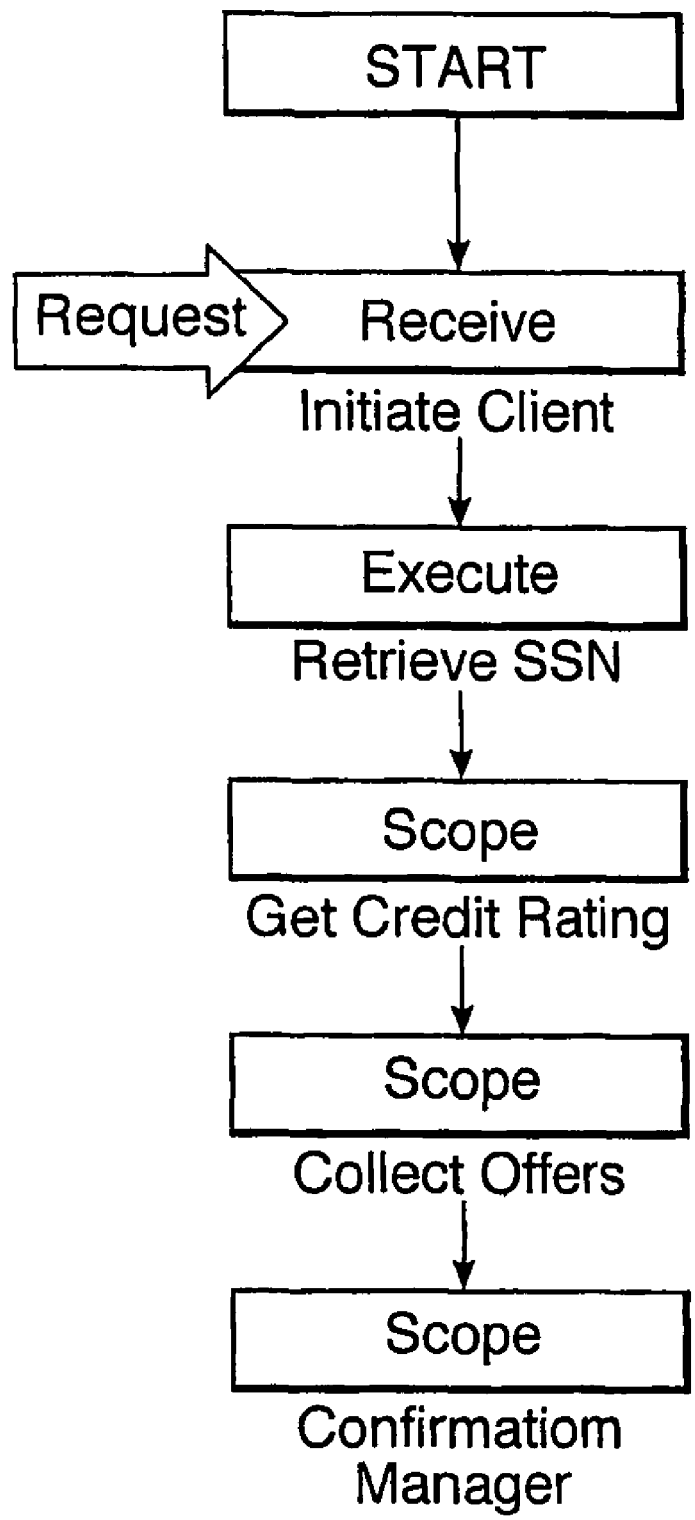
FIG. 1 shows a process in the form a of a flow chart.

FIG. 1 shows a flow chart representation of part of a simple process related to a credit application in a series of stages requiring the use of a series of services represented here by boxes. The process is initiated by receipt of a request for quotes for a loan from the user who has an applicant seeking the loan. The first step is to obtain the loan applicant's social security number (SSN) based on identification supplied by the applicant and for this task service Retrieve SSN is selected. Once the social security number has been obtained, credit ratings for the loan applicant as identified by their SSN are obtained using service Get Credit Rating. Once a credit rating value is obtained, offers of credit are sought using service Collect Offers. From the offers of credit received a preferred offer is selected and forms the basis of a response to the user from service Confirmation Manager.

Figure 2:
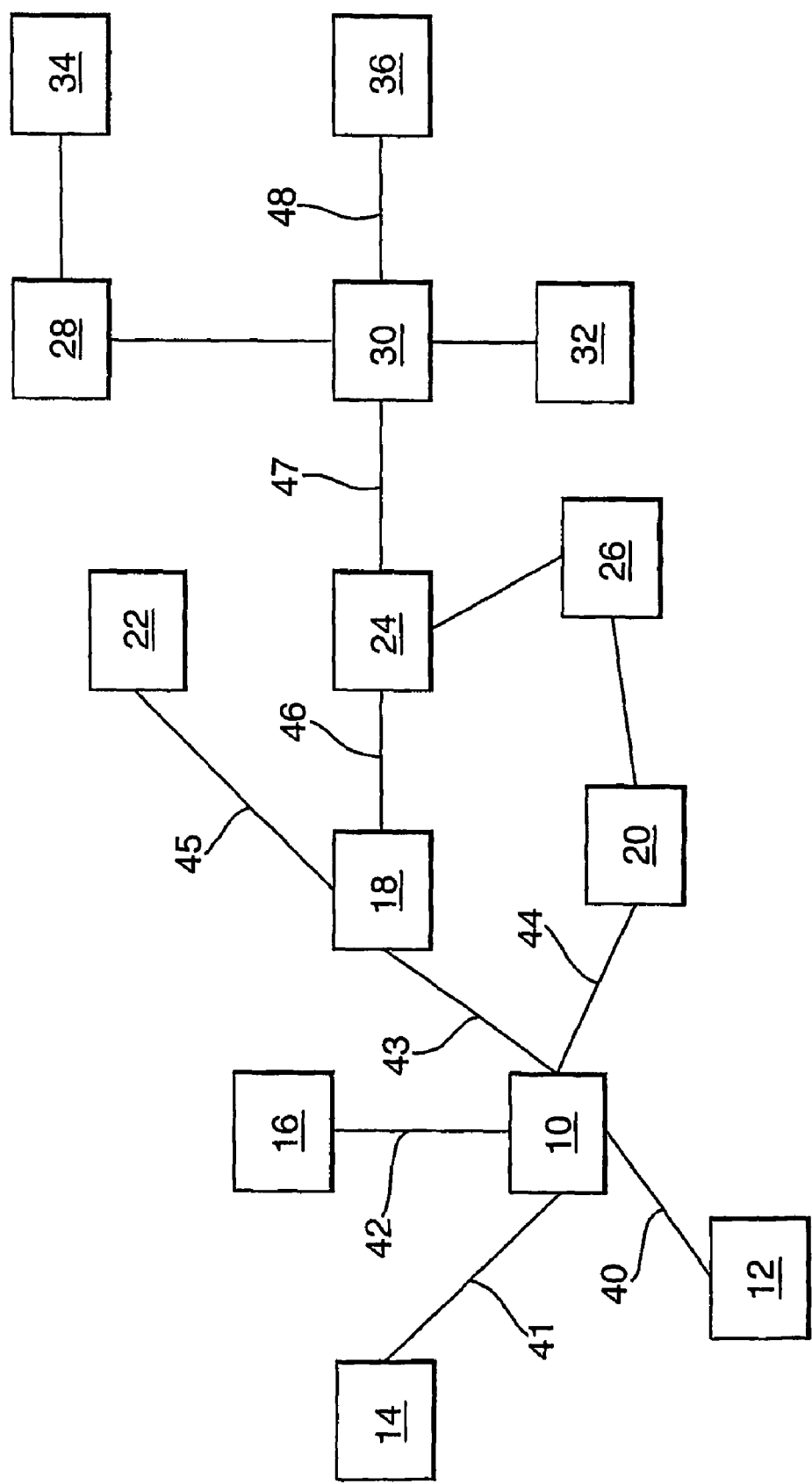
FIG. 2 shows a network for implementing an exemplary embodiment of the invention.

FIG. 2 shows a network capable of supporting web services. The network of FIG. 2 consists of a plurality of nodes of which a representative number 10-36 are shown. The nodes are interconnected with each other in a partial mesh, i.e. not every node has a direct connection with every other node. In the area of the network of interest for the purposes of this example, node 10 is connected via connections 40, 41, 42, 43 and 44 to nodes 12, 14, 16, 18, and 20, respectively. Node 20 has a further connection to node 26 that is itself further connected to node 24. Node 18 has further connections 45 and 46 to nodes 22 and 24, respectively. Node 24 has a further connection 47 to node 30. Node 30 is in turn connected to node 28 via connection 48 and is further connected to nodes 28 and 32. Node 28 is further connected to node 34.

A first embodiment of the invention will now be described by way of example with reference to the above user who has access to the network through node 10. The user wishes to set up a process using the resources of the network. The user does not know whether sufficient resources are present on the local node 10 and so they invoke a web service to allow resources on various nodes to be located and combined, as appropriate, to provide the desired process. To do this they invoke a search process in the user's local node 10 to locate the necessary services. A typical service may, for example, be in the form of software, data or computer hardware. The use here of a web service is only one possibility. In an alternative embodiment, the user might access a local application interface, typically written in a language such as JAVA to start the search process which might then proceed through a peer to peer mechanism. In a further alternative embodiment, the user might access a web portal and use a search portlet to initiate the search.

According to the first embodiment, each node in the network runs a process that listens on a well-known port and responds to queries. This process also maintains, or is able to obtain, a list of all services currently available on the node. This includes software services that are running (i.e. active) on that node and those that are not running (i.e. inactive) and can be started on that node, if desired. This may also include data or software that is not present on that node but may be accessed and installed on that node.

According to a further embodiment, in the case of computer networks, the scheduling process has access to a node capability description. One example of this is the grid service scheduling process. This process is also aware of each node's network neighbours and is able to send messages to them. The process participates in echo discovery, as described below.

Figure 3:
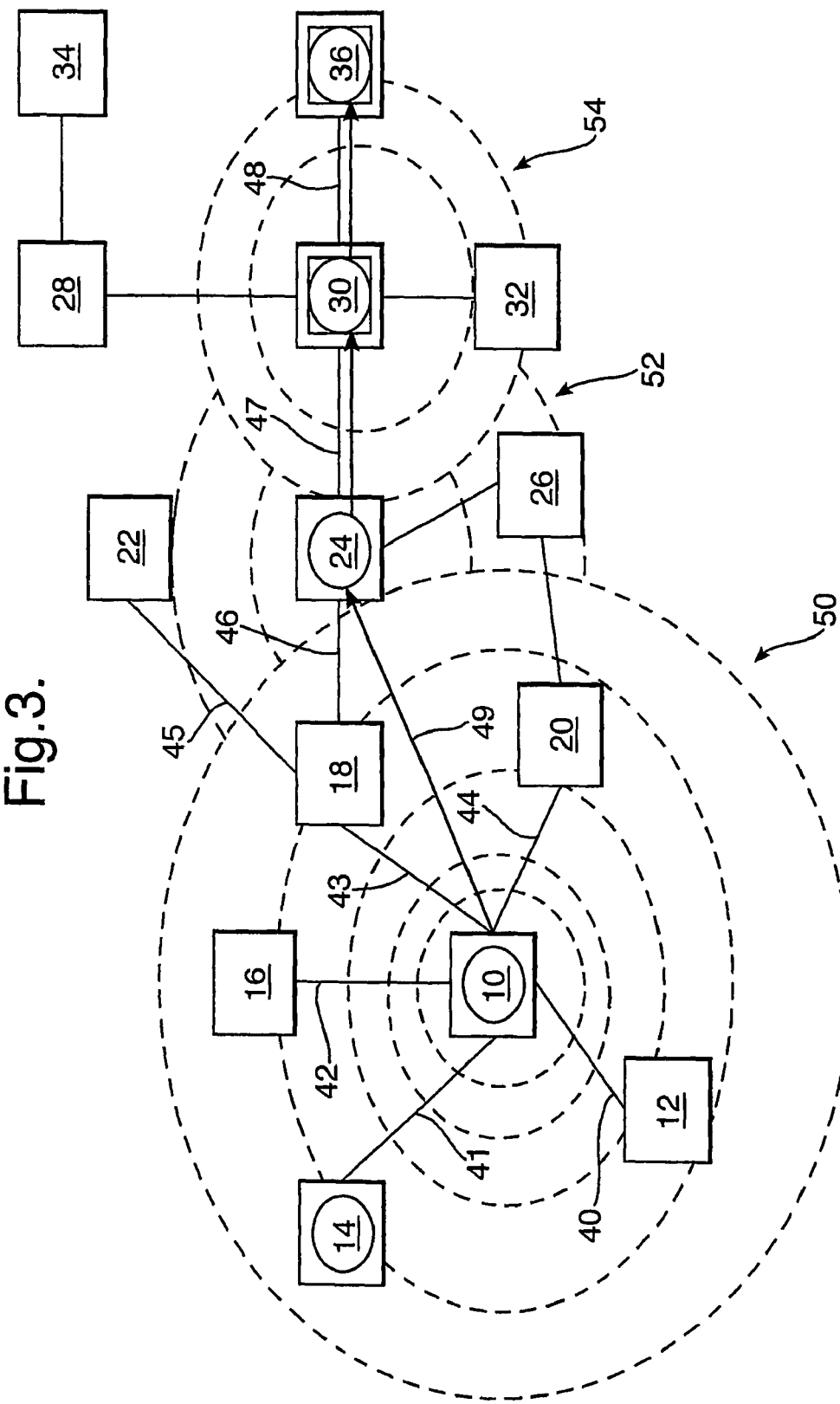
FIGS. 3 and 4 illustrate a series of searches in the network of FIG. 4 according to the present exemplary embodiment.
Figure 5:
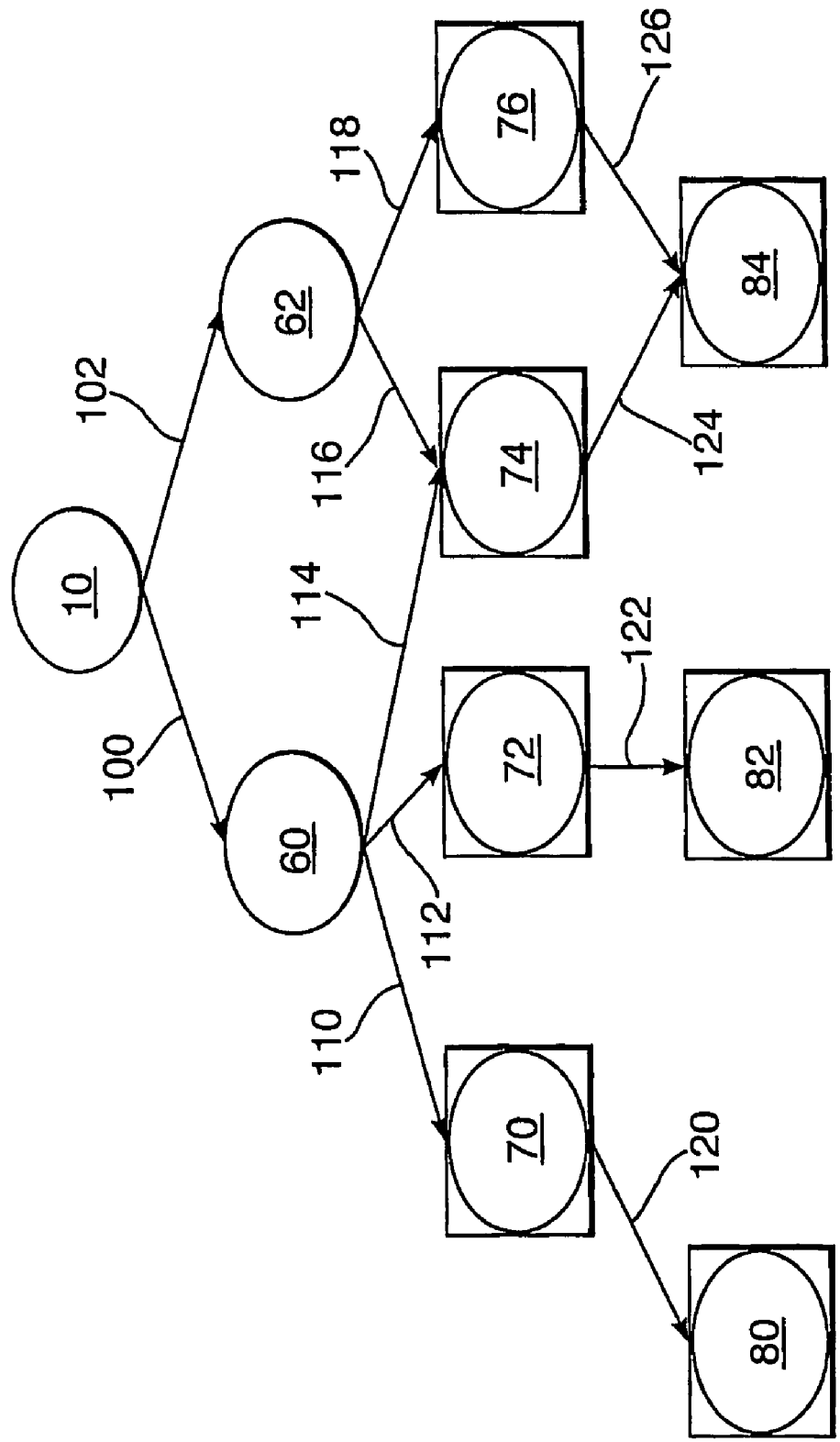
FIG. 5 shows a decision graph derived from the searches of FIGS. 3 and 4.

A process may be thought of and represented as a graph where the vertices are the component services and the arcs connecting them reflect dependencies or interaction (see for example, FIG. 5). For example, consider a sequence of services that must be executed in order, possibly constrained by the output of one being the input to the next service (other structures such as parallel executions and choices may also be found.) A scheduler is responsible for instantiating an executable process from a process definition to meet performance and cost constraints. The scheduler is started by the user when they supply the definition of the desired process to the local search process in the user's local node. In order to instantiate the process the scheduler initiates a search for the first service in the sequence. This is illustrated in FIG. 3 by the expanding circles 50 emanating from node 10. These circles represent the search spreading out from node 10 to nodes ever further away until sufficient nodes with the ability to provide the first service have been located. Each first service is located in a "first" node. As shown in FIG. 3, two candidate first nodes 14 and 24 are located as a result of the first stage of the search. Node 14 is connected directly to node 10 via connection 41. Node 24 is connected to node 10 via node 18 and connections 43 and 46.

According to a further preferred embodiment, a bounded echo is used for this search. The bounded echo searches initially over network nodes within a restricted area, the area expanding until a defined number of suitable services has been discovered.

The characteristics of the discovered nodes and information on the connectivity to these nodes (i.e. connections 41 to node 14 and 43 and 46 to node 24 via node 18) are returned to the scheduler at the user's node 10. The scheduler then selects on the basis of criteria supplied by the user a number (a short list) of nodes providing an instance of the first service for potentially providing the first service. A search for the second service in the sequence is then remotely initiated from selected first nodes 14 and 24 providing an instance of the first service. This is represented in FIG. 3 by the expanding circles 52 emanating from selected first node 24. Only one second-stage search is illustrated here for clarity, although searches may occur in parallel from a number of selected "first nodes". A plurality of "second nodes" are located that are able to provide the second service (only one second node 30 is shown in FIG. 3 for clarity). The characteristics of the discovered "second" nodes, i.e. nodes for potentially providing the second service in the sequence, are returned to the scheduler. Information on the connectivity between the nodes able to provide the first service and the nodes able to provide and second service is also returned to the scheduler which then selects a short list of the second nodes. A search for the third service is started in a similar way, i.e. from selected nodes providing an instance of the second service. This is represented in FIG. 3 by the expanding circles 54 emanating from selected second node 30. Other searches that may be taking place in parallel at this stage are not shown for clarity. In the example of FIG. 3, a plurality of "third nodes" are located that are able to provide the third service (only one third node 36 is shown for clarity). In a similar way a number of fourth, fifth, etc nodes able to provide a desired fourth, fifth, etc service are located in subsequent stages, as required (not shown). This process is repeated until a sufficient number of nodes providing an instance of each service in the sequence are found.

Figure 4:
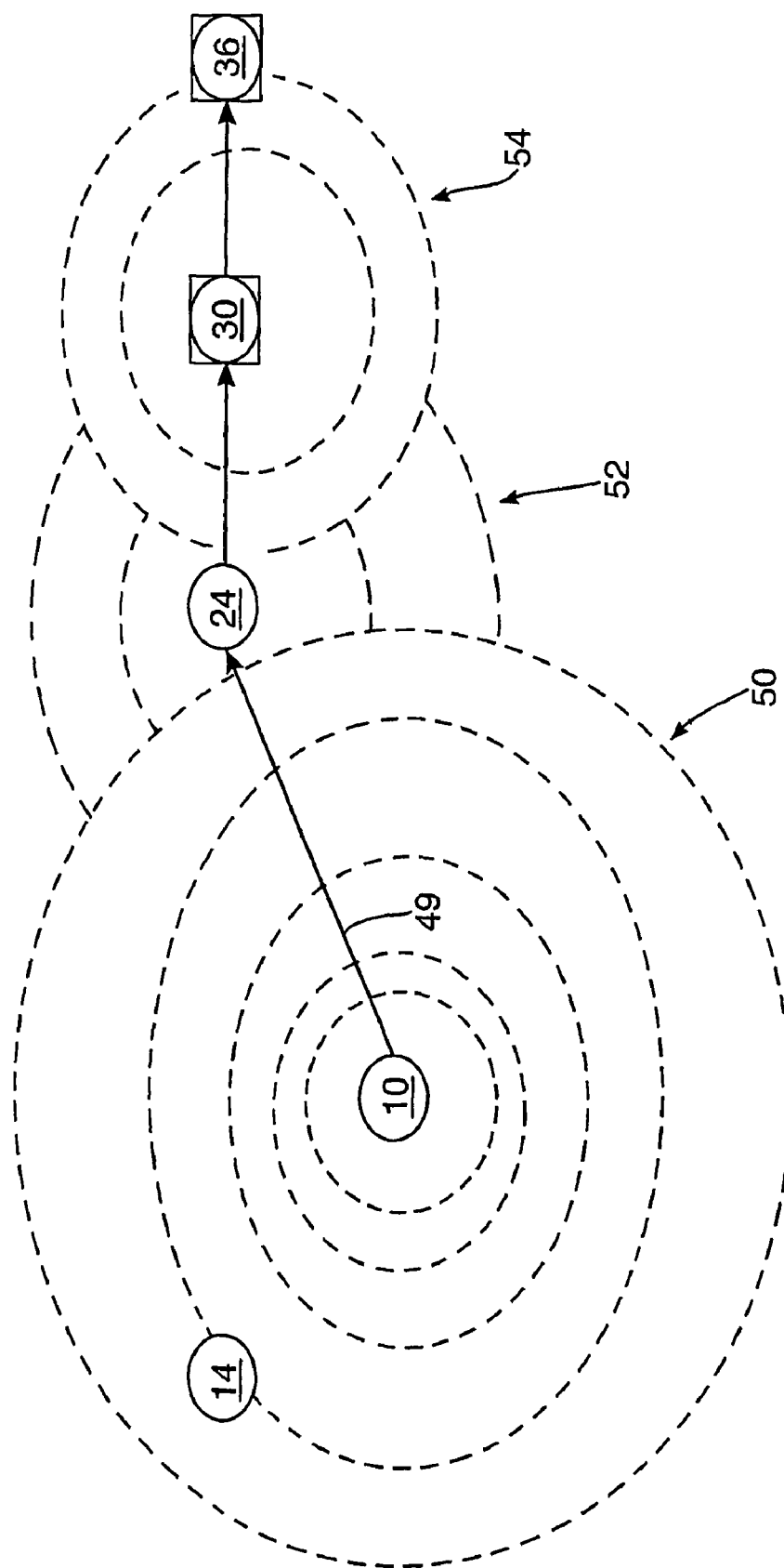

FIG. 4 shows part of the network of FIG. 3 with only nodes selected as a result of the search shown to illustrate the searches of FIG. 3 more clearly. In FIG. 4, arrow 49 represents the link between user node 10 and selected first node 24.

According to a further preferred embodiment of the invention, the scheduler is able to build up a graph, as shown in FIG. 5, where each path from apex (10) to an opposite extremity (e.g. 82) represents a viable instance of the process. Data on performance and cost is associated with each vertex (services 60-84) and arc (network connections 100-126) of the graph. User node 10 is connected to first services 60, 62 by network connections 100, 102. First service 60 is connected to second services 70, 72, 74 by network connections 110, 112 and 114, respectively. First service 62 is connected to second services 74, 76 by network connections 116 and 118, respectively. Second service 70 is connected to third service 80 by network connection 120. Second service 72 is connected to third service 82 by network connection 122. As a result of the third stage search, second services 74 and 76 both located the same single third service 84. Hence, second services 74 and 76 are connected to third service 84 by network connections 124 and 126, respectively. Typically the decision graph would extend to further service instances connected via further network connections, until instances of all the required services and their interconnections were represented in the graph. To relate the decision graph to the example of FIGS. 3 and 4, arcs 100, 110 and 120 could relate to links 49, 47 and 48, respectively and services 60, 70 and 80 could relate to nodes 24, 30 and 36, respectively.

The scheduler then chooses the most appropriate path to satisfy the end user's constraints, calculating the quality of each path based on the performance and cost data associated with the vertices and the arcs of each path. According to a further preferred embodiment, at each stage in the discovery, the scheduler can prune unpromising paths. For example, if one constraint is that a process consisting of a sequence of three services must be able to execute in 10 seconds and the time taken along one path to execute the first service instance, propagate results to the second and execute the second takes 11 seconds, there is no point in continuing with a search for an instance of the third service along that path.

Costs that may be taken into account in choosing a path through the decision graph (and hence the configuration of service instances and connections to implement the process) include but are not limited to connection bandwidth, proximity of service instances, network cost of transferring data between services, financial cost of using a resource, availability of resources, ownership of resources, security and the desire to prevent unauthorised access to information being processed.

Once the optimum configuration has been selected it is implemented according to a further preferred embodiment by means of an overlay network that links the user with the required services, establishes relationships between these services and sets up data flows there between.

According to a further preferred embodiment of the invention, a request is generated for a sequence of services with appropriate quality metrics. As each node providing one of the required services is discovered, it initiates a bounded echo search for the next service in the sequence, without returning to the scheduler. The echo algorithm then aggregates the results and returns an ordered list of service instances to the scheduler together with the performance of the list against each metric. The aggregation is executed by an echo daemon that is present on each node. The echo daemon keeps a record of all active searches it has propagated and aggregates the returned results. The echo daemon is responsible for all communications involved in the echo pattern. Every node in the system has a software process running as part of the echo daemon that listens on a standard communication port for echo messages. The daemon will recognise if a message is a search or an echo. If it is a search it will check locally for the required service and if necessary pass the search message to its neighbours except the message originator. Before passing on the search message, the daemon will check a hop count to see if further propagation of the search is allowed. The hop count is a simple numeric count that is incremented every time the search is propagated, and is used to limit the extent of the search area, i.e. to provide a bounded search. The hop count starts at zero. Each time a node forwards a search message, the hop count is incremented. A node will only forward a search message if the hop count is less than a predetermined limit. If it is equal to the limit, the expansion phase of the algorithm ends and the node returns information on the search to the requesting node.

The echo daemon keeps a list of its neighbours, and periodically maintains it. When responses to searches return, the daemon manages the aggregation process and passes the collected responses back to the search originator. When any customer starts a search they will preferably have access to a graphical interface that allows them to configure the search and generate the first search messages to be issued from the echo daemon on the local node.

This embodiment is particularly appropriate for finding sequences rather than structures with more complex synchronisation (for example containing choices, parallel execution etc.). The two can be combined in a further embodiment with the scheduler explicitly directing the search in the more complex situations and relying on the echo daemon aggregation in other situations.

According to a preferred embodiment, the initial process design is carried out using an integrated development tool allowing graphical representation of the process, as illustrated in FIG. 1. The representation based on WDSL may be produced using Oracle BPEL designer or other commercially available tool, is shown, by way of example, for the loan application described above. The same information may be made available in an XML-based file where partner links and orchestration logic describe the identity of the component services and the sequencing in the flow, for example:

```
<partnerLinks>
    <partnerLink name="client" partnerLinkType="tns:LoanFlowPlus"
partnerRole="LoanFlowPlusRequester" myRole="LoanFlowPlusProvider"/>
    <partnerLink name="creditRatingService"
partnerLinkType="services:CreditRatingService"
partnerRole="CreditRatingServiceProvider"/>
    <partnerLink name="UnitedLoanService"
partnerLinkType="services:LoanService" myRole="LoanServiceRequester"
partnerRole="LoanServiceProvider"/>
    <partnerLink name="StarLoanService"
partnerLinkType="services:LoanService" myRole="LoanServiceRequester"
partnerRole="LoanServiceProvider"/>
    <partnerLink name="confirmationManager"
partnerLinkType="task:TaskManager" partnerRole="TaskManager"
myRole="TaskManagerRequester"/>
    <partnerLink name="exceptionManager"
partnerLinkType="task:TaskManager" partnerRole="TaskManager"
myRole="TaskManagerRequester"/>
   </partnerLinks
...
....
....
<!-- ***************************************************
    Receive input from requestor - this is what initiates
    this flow. We are passed a loan application business doc
    *************************************************** -->
      <receive name="receiveInput" partnerLink="client"
portType="tns:LoanFlowPlus" operation="initiate" variable="input" createInstance="yes"/>
      <!-- retrieve SSN using Entity bean -->
      <bpelx:exec name="RetrieveSSN" language="java" version="1.4">
         <![CDATA[
!-- ***************************************************
    Invoke the synchronous creditRatingService. Define a scope
    for handling faults from it and set the credit rating in the
    loan app bus doc if we get a credit rating back. In the case
    of a NegativeCredit exception, set it to -1000.
    *************************************************** -->
         <scope name="getCreditRating" variableAccessSerializable="no">
            <variables>
               <variable name="crInput"
messageType="services:CreditRatingServiceRequestMessage"/>
               <variable name="crOutput"
messageType="service:CreditRatingServiceResponseMessage"/>
               <variable name="crError"
messageType="services:CreditRatingServiceFaultMessage"/>
            </variables>
```

This provides the structured search string used as input to the service discovery process. The client node initiates a bounded echo search for the first service required, in the example above a service that allows retrieval of the user's loan applicant's social security number (SSN). The number of instances returned by the search is configurable, the fewer returned the faster and easier is the search and the scheduling, but a more advantageous solution may be missed. Once the first service has been identified a second series of bounded echo scans take place originating at the nodes supplying the social security number: this search looks for the get-credit-rating service.

This approach to service discovery advantageously produces an output of a series of traces each of which is a viable instantiation of the process. This again can be represented in a form similar to a decision graph, as shown in FIG. 5. In FIG. 5, each path through the graph represents the connectivity and proximity that has been established for the services that are required to make the process instance; thereby reducing the amount of information needed in order to be able to select the most appropriate combination or path.

According to further preferred embodiments, further refinements are introduced including adding identification and costing information to nodes and network links in the graph so that a fairly simple method that finds the lowest cost path through the graph will identify the best combination. Cost metrics used to annotate the graph can, for example, be related to the available computing resources, the performance of services if they already exist, the time-to-load for services that have to be started, and the performance of the connecting network links. The addition of annotations to the graph facilitates a process of pruning the graph as it is built, further simplifying the scheduling process.

A sequence diagram for a part of the discovery and scheduling process described above is shown in FIG. 6. FIG. 6 uses the Unified Modelling Language (UML)—trademarks of Object Management Group, Inc.

FIG. 6 shows a simplified UML sequence diagram highlighting some of the key features of the discovery process. Time starts in the top left hand corner and advances down the diagram, each of the boxes along the top (:Application Schedule; :local echod; :remote echod 1; :remote echod 2; remote echod 3) represents a function. In the case of the echoed search, each of these functions is running on a separate node. The echoed search functions (:local echod; :remote echod 1; :remote echod 2; remote echod 3) are the pieces of code that handle search requests: accepting the search request messages, querying the local node accordingly, passing on the search request to subsequent nodes and returning results to the requesting scheduler. Each echoed search function has details of all local connections to its node and the origin of all live search requests.

One way for the customer to supply a task sequence for a process they want executed and any related quality of service metrics is to provide a workflow. Workflow is a term used to describe the tasks, procedural steps, organizations or people involved, required input and output information, and tools needed for each step in a business process. Workflow is an IT technology which uses electronic systems to manage and monitor such processes. It allows the flow of work between individuals and/or departments, e.g. as implemented as transfers of data between computers in a network, to be defined and tracked.

The sequence illustrated in FIG. 6 is as follows.

When a potential customer supplies a required workflow, an application scheduler is created to handle the scheduling task (function Application schedule). The scheduler is started by the user when they supply a workflow definition to the local search function in the user's local node. A workflow approach to analyzing and managing a process can be combined with an object-oriented programming approach, which tends to focus on documents and data. In general, workflow management focuses on processes rather than documents. Commercially available workflow automation products allow an organisation to create a workflow model and components such as online forms and then to use this product as a way to manage and enforce the consistent handling of work.

The application scheduler looks for the first component of the workflow on the local node (function :local echod) by querying the local echoed search function (message "initiate search"). The local echoed search function will test the local node (see arrow "local check" under function :local echod) and if the required component is not present it will forward the search (see message "propagate search") to the echoed search functions of it's neighbours (i.e. function :remote echod 1). Each neighbour echoed search function searches in turn its local node (see arrow "local check" under function :remote echod 1). If the desired service is not found on the local node, the search is forwarded to the echoed search function of the neighbours' neighbours (message "propagate search" sent from remote echod 1 function to remote echod 2 function). In the present example, remote echoed 2 search function locates the first service (or workflow component) on its local node and returns a positive response (not shown) to the application scheduler. The positive response may either be passed back through the echo chain, or passed directly to the originating application scheduler.

When the application scheduler receives a positive response indicating the location for the first service it send a status checking request (message "request current status") that queries for the cost of that workflow component to the successful echoed search function (:remote echod 2). The successful function returns this value to the application scheduler (message "return status to scheduler" from :remote echod 2 to :application scheduler) where the scheduling decision graph is being built. The application scheduler then starts a search (message "initiate search" from :application scheduler to :remote echod 2) for the next service from all successful locations with an instance of the first service. This process continues until all required services are successfully located and their status determined. In a further preferred embodiment, as the scheduling decision graph is built the application scheduler periodically checks for potential duplication of sites and prunes the scheduling decision graph accordingly. When all components are located the application scheduler processes the scheduling decision graph and returns the optimum arrangement of connected services to the user.

According to a further embodiment, the invention provides for the setting up of parallel processing processes. The use of parallel approaches may be accommodated in a number of ways. For example, the scheduler for a grid might expose a grid service interface that accepts a request involving parallel processing and then handles the distribution. Alternatively, parallel execution may be included in the workflow description, where the output of one service is sent to the input of multiple identical services.

Grid computing is used extensively for parallel processing particularly in scientific research. However, grid computing is also applicable to business applications that do not require as much parallelism as scientific applications. The invention may be applied to web or grid services wherever they are used. A further advantage of the present invention, is, that it allows the scheduler to conduct a two-tier search. Conventional web services only use existing services. The present invention can advantageously allow the scheduler to also consider starting services on suitable nodes in order to meet the process requirements. This includes both starting services that are present on a node but not running and downloading the appropriate service code to a selected node so that it may be installed and run. Suitable software provisioning systems that allow instantiation on demand include grid computing and CORBA (the common object broker architecture). A new range of virtualisation and server-automation software is expected to allow similar instantiation on demand suitable for use with the present invention.

The present invention provides a more robust solution than centralised directory based solutions and will advantageously allow continued operation in the face of network failure. Conventional approaches such as UDDI using registries will fail if the part of the network containing the directory becomes unreachable. The searches of the present invention are initiated by the user and radiate out to reach all parts of the network currently connected to the start point thus allowing full or partial progress to be maintained in the event of partial network failure. If parts of the network fail after the locations and costs of required services are acquired by the scheduler, any service that is in the failed area of the network will no longer be reachable and use of it will be denied. As the search process of the invention uses local knowledge, a second search may immediately be started to locate alternative instances of any services to which access is denied as a result of the problems with the network. Advantageously, the second search will inherently only collect data from nodes still connected to the originating node.

According to a further preferred embodiment, the locations of alternate services found during the original search but not selected for use are stored against such network problems occurring. This allows the network to quickly switch to available working services in the event of partial network failure. Resilience is further enhanced by the lack of any central services at the highest level. If the scheduling process were to be centralised, failure of the single process could be fatal. According to a preferred embodiment, each scheduler is responsible for only one process which may fail without adversely affecting all the others which may still work. The system is therefore resilient at multiple levels, no central services at the highest level limits the effects of any failure, and storing the locations, for example as part of a selection graph, of multiple suitable services helps rapid recovery should failure occur. Up to date information is collected when it is needed using dynamic discovery rather than depending on potentially out-of-date directory lookup. The discovered information can be filtered during the discovery process so that the range of possible configurations to be considered is restricted to those most likely to be acceptable. It also implicitly combines information on the service performance with the relevant network performance. This can be useful in comparing, for example, two high-performance web services that need to communicate significant data volumes via a slow network link with equivalent but slower processes available on the local computer (i.e. avoiding the slow network link). The present invention provides a simple, distributed way of addressing such problems.

According to a further embodiment, a video on demand process may be configured. A video on demand service may consist of a video service and a delivery service that may be represented as a simple two-stage workflow that the customer starts themself by supplying the name of the video and the delivery address (this may be obtained automatically in the background without user interaction). The first stage of the echo pattern sets out to find a video server capable of supplying the requested video. The second phase of the echo search then sets out to find suitable delivery services. The scheduler chooses a video source, and a delivery service that can in concert provide the video on demand service with the required levels of quality for a video.

According to further embodiments, the present invention may be applied to the configuration of a network to support: the following Third-Party Call Control Third-party call control is used to create and manage a call initiated by an application. Using a third-party call Web Service, application developers can invoke call-handling functions by providing the addresses (or telephone numbers) of two endpoints. A suitable application will be one that is invoked on either a busy or unavailable connection to the subscriber's PSTN line. One example of how this would work is when a user has dialled up to the Internet utilising their PSTN connection. An application could pick up this signal and provide to the called user the choice of sending the call to voicemail, diverting the call to another number or rejecting the call. The response made by the user is handled within the network. The service may also trigger an application whenever a certain number is dialled. This would be viable for many existing Intelligent Network service offerings. One example of the use of such a service is monitoring a particular stock price: when the price reaches a threshold value, the client application invokes a third-party call between one or more brokers and their corresponding customers to decide actions to be taken.

SMS

A method of sending SMS messages from an application, e.g. a client application (residing on a third-party platform, or in-house application platform) that is triggered by an external stimulus (such as a voicemail, traffic, weather or other information report, or e-mail message). The application invokes an SMS Web Service. The application provides the message (string of text), and the called user's details. The Web Service can then invoke a message directing the mobile SMS-C to send the message to the called user.

MMS

Allows multimedia messages to be sent to users and retrieved from a network by an application. It makes use of the MMS capability provided by a mobile network.

The present invention allows a desired process to be efficiently built from diverse services spread in an unknown manner across a network. The services may be of various types including but not limited to software that is either running, installed but inactive or requiring installation; data that is either installed or requiring installation and processing power or storage as may be provided by devices such as computers, PDAs and mobile phones. This is achieved according to a preferred embodiment by the construction of a decision graph that allows rapid decision to be made as the most suitable service instances and connections. By exploiting a searching strategy that spreads out from the user the invention inherently tends to optimise speed while minimising connection costs.

The present invention is not limited to processes comprising a sequence of services that must be executed in a set order but applies equally to other structures such as parallel execution and sequences with choices or decisions. The present invention is not limited to is a particular form or topology of network but applies to ring, tree, partial and full mesh and other topologies implemented in electrical, optical or other electromagnetic media. The invention may also be applied without changing its essential character to services distributed across more than one network. The invention is not limited to any particular type of service but extends to business applications, communications services, manufacturing systems amongst other applications.

Abbreviations
BPEL Business Process Execution Language
BPEL4WS Business Process Execution Language for Web Services
HTTP Hyper Text Transfer Protocol
MMS Multimedia message service
MMS Multimedia Messaging Service
OASIS Organisation for the Advancement of Structured Information Standards
OGSA Open Grid Services Architecture
PSTN Public Switched Telephone Network
SMS Short Messaging Service
SMS Short Message Service
SOA Service-Oriented Architecture
SOAP Simple Object Access Protocol
SSN Social Security Number
UDDI Universal Description, Discovery, and Integration.
UML Unified Modelling Language
WSDL Web Services Description Language;
XML Extensible Mark-up Language

What is claimed is:

1. A method of configuring a network for a process, in which the network comprises a plurality of nodes for providing services and in which the process comprises a plurality of the services, the method comprising:
   starting from a first node, searching the network for nodes suitable for providing a first one of the required services;
   starting from the node or nodes identified as a result of the search as suitable for providing the first service, searching for nodes suitable for providing a second one of the required services;
   repeating the search for each remaining required service, starting each time from the identified node or nodes suitable for providing the previous required service until nodes suitable for providing all the required services are located;
   obtaining information on connections between the or each selected node suitable for providing one of the required services and the or each node identified as a result of the search as suitable for providing a next required service; and
   selecting at least one node suitable for providing the next required service on the basis of the node information and connection information obtained for that node.

2. The method as claimed in claim 1 including obtaining information on the nodes identified as a result of the search as suitable for providing the first service and selecting on the basis of the node information at least one node suitable for providing the first service.

3. The method as claimed in claim 2 including obtaining information on connections between the first node and the nodes identified as a result of the search as suitable for providing the first service and selecting on the basis of the node information and connection information at least one node suitable for providing the first service.

4. The method as claimed in claim 2 in which the search for nodes suitable for providing the second service is started from the or each selected node suitable for providing the first service.

5. The method as claimed in claim 1 including obtaining information on the nodes identified as a result of the search as suitable for providing each of the required services and selecting on the basis of the node information at least one node suitable for providing each of the required services.

6. The method as claimed in claim 5 in which the search for nodes suitable for providing a next one of the required services is started from the or each of the selected nodes suitable for providing the previous service.

7. The method as claimed in claim 1 including identifying a plurality of paths through the network, each path comprising nodes suitable for providing at least some of the required services and connections between the nodes, evaluating the nodes and connections in each of the paths and selecting on the basis of the evaluation one or more paths for providing the process.

8. The method as claimed in claim 7 including deselecting duplicated paths so that not all of the nodes identified as a result of the search as suitable for providing the required services comprised in one selected path are comprised in another selected path.

9. The method as claimed in claim 7 in which the method steps set out in claim 8 are executed at an intermediate stage in the searching.

10. The method as claimed in claim 7 including keeping information on deselected paths and in the event of a failure in a selected path replacing that path with an appropriate deselected path.

11. The method as claimed in claim 2 including keeping information on the identified nodes suitable for providing the required services not selected by the means for selecting and in the event of a failure of a selected node replacing that node with an appropriate not selected node in which failure of a node includes failure of a connection to that node.

12. The method as claimed in claim 1 in which a node is suitable for providing a service if that service is active on the node.

13. The method as claimed in claim 1 in which a node is suitable for providing a service if that service is inactive on the node but capable of being activated on the node.

14. The method as claimed in claim 1 in which a node is suitable for providing a service if that service is not present on the node but capable of being downloaded to and activated on the node.

15. The method as claimed in claim 1 in which the nodes form part of a computing grid.

16. The method as claimed in claim 1 including searching the network by use of a bounded echo algorithm.

17. The method as claimed in claim 1 including stopping the search for at least one of the required services on finding a set number of nodes suitable for providing that service.

18. The method as claimed in claim 16 including using the bounded echo algorithm for processing the information and returning an ordered list of selected nodes to the first node.

19. A network for providing a process requiring a plurality of services, in which the network comprises a plurality of nodes for providing the services; in which the network comprises:
   means for searching the network starting from a first node for nodes suitable for providing a first one of the required services;
   means for searching the network starting from the node or nodes suitable for providing the first service identified as a result of the search, for nodes suitable for providing a second one of the required services;
   means for searching the network for each remaining required service, starting each time from the node or nodes suitable for providing the previous required service identified as a result of the search; and means for obtaining information on connections between the or each selected node suitable for providing one of the required services and the or each node identified as a result of the search as suitable for providing a next required service;

in which the means for selecting are arranged to select at least one node suitable for providing the next required service on the basis of the node information and connection information obtained for that node.

20. The network as claimed in claim 19 comprising means for obtaining information on the identified nodes suitable for providing the first service and means for selecting from the identified nodes on the basis of the node information at least one node suitable for providing the first service.

21. The network as claimed in claim 19 comprising means for obtaining information on connections between the first node and the nodes providing the first required service and means for selecting on the basis of the node information and connection information at least one node suitable for providing the first service.

22. The network as claimed in claim 19 in which the search for nodes suitable for providing the second service is started from the or each selected node suitable for providing the first service.

23. The network as claimed in claim 19 comprising means for obtaining information on the identified nodes suitable for providing the required services and means for selecting on the basis of the node information at least one node suitable for providing each of the required services.

24. The network as claimed in claim 19 in which the means for searching for nodes suitable for providing a next one of the required services is arranged to start from the or each selected node suitable for providing the previous required service.

25. The network as claimed in claim 19 including selection means for identifying a plurality of paths through the network each path comprising nodes suitable for providing at least some of the required services and connections between the nodes, and for evaluating the nodes and connections in each of the paths and for selecting on the basis of the evaluation one or more paths to provide the process.

26. The network as claimed in claim 25 in which the selection means is arranged to deselect duplicated paths so that not all of the nodes identified as a result of the search as suitable for providing the required services comprised in one selected path are comprised in another selected path.

27. The network as claimed in claim 25 in which the selection means is arranged to execute at least one of the selection and deselection at an intermediate stage in the searching.

28. The network as claimed in claim 25 in which the selection means is arranged to keep information on deselected paths and in the event of a failure in a selected path to replace that path with an appropriate deselected path.

29. The network as claimed in claim 25 in which the selection means is arranged to keep information on the identified nodes suitable for providing the required services not selected by the means for selecting and in the event of a failure of a selected node to replace that node with an appropriate not selected node in which failure of a node includes failure of a connection to that node.

30. The network as claimed in claim 19 in which a node is suitable for providing a service if that service is active on the node.

31. The network as claimed in claim 19 in which a node is suitable for providing a service if that service is inactive but capable of being activated on the node.

32. The network as claimed in claim 19 in which a node is suitable for providing a service if that service is not present on the node but is capable of being downloaded to and activated on the node.

33. The network as claimed in claim 19 in which the nodes form part of a computing grid.

34. The network as claimed in claim 19 comprising means for searching the network by use of bounded echo algorithm.

35. The network as claimed in claim 19 in which the means for searching is arranged to stop the search for at least one of the required services on finding a set number of nodes suitable for providing that service.

36. The network as claimed in claim 34 in which the means for selecting is arranged to use the echo algorithm to process the information and return an ordered list of selected nodes to the first node.

37. A computer-readable non-transient storage medium storing a computer program comprising instructions which, when executed on a computer, cause the computer to operate in accordance with the method steps of claim 1.

* * * * *